United States Patent
Brown

(10) Patent No.: US 8,141,301 B2
(45) Date of Patent: Mar. 27, 2012

(54) EXTERNALLY BRACED INFLATABLE STRUCTURES

(75) Inventor: Glen J Brown, Santa Cruz, CA (US)

(73) Assignee: HDT Expeditionary Systems, Solon, OH (US)

( * ) Notice: Subject to any disclaimer, the term of this patent is extended or adjusted under 35 U.S.C. 154(b) by 505 days.

(21) Appl. No.: 12/069,590

(22) Filed: Feb. 12, 2008

(65) Prior Publication Data

US 2009/0199489 A1 Aug. 13, 2009

(51) Int. Cl.
*E04H 15/20* (2006.01)
(52) U.S. Cl. ......... 52/2.13; 52/2.19; 52/108; 244/159.2; 244/123.11
(58) Field of Classification Search ............ 52/2.25, 52/2.26, 108, 2.12, 2.13, 2.17, 2.18, 2.19, 52/2.21; 244/123.11, 158.3, 159.2
See application file for complete search history.

(56) References Cited

U.S. PATENT DOCUMENTS

| | | | |
|---|---|---|---|
| 3,508,270 A * | 4/1970 | Cook | 343/705 |
| 4,248,748 A | 2/1981 | McGrath et al. | |
| 4,662,130 A * | 5/1987 | Miura et al. | 52/108 |
| 5,421,128 A | 6/1995 | Sharpless et al. | |
| 5,559,164 A | 9/1996 | Babu et al. | |
| 5,677,023 A | 10/1997 | Brown | |
| 5,735,083 A | 4/1998 | Brown et al. | |
| 6,182,398 B1 | 2/2001 | Head | |
| 6,463,699 B1 | 10/2002 | Bailey et al. | |
| 6,685,784 B1 | 2/2004 | Jacino et al. | |
| 6,735,920 B1 * | 5/2004 | Cadogan | 52/741.1 |
| 2001/0054123 A1 * | 12/2001 | Henrikson et al. | 710/100 |
| 2004/0194397 A1 * | 10/2004 | Brown et al. | 52/108 |

* cited by examiner

*Primary Examiner* — William Gilbert
(74) *Attorney, Agent, or Firm* — Fay Sharpe LLP

(57) ABSTRACT

An inflatable structure is augmented with transverse frames and bracing cables to make a truss-like structure. This feature is adaptable for adding strength to a plain inflatable structure and to an inflatable structure forming a structural arch. It can also be incorporated into an inflatable wing.

20 Claims, 6 Drawing Sheets

EXTERNALLY BRACED INFLATABLE STRUCTURES

BACKGROUND OF THE INVENTION

Inflatable structures, sold by applicant under the trademark AIRBEAM are characterized by low mass, low stowed volume for on-site deployment, overload tolerance and tailored strength and stiffness. Current applications use multiple deploy-strike cycles with inflation pressure maintained while in use.

The known inflatable structures are limited in size and load carrying by both manufacturing limitations and by material properties. This invention overcomes size limitations and improves strength and stiffness of very large inflatable structures.

The known inflatable structures are described in U.S. Pat. Nos. 5,421,128 and 5,735,083. A high bias angle that elongates under pressure provides high bending strength in these structures. This invention, having added external tension elements, provides an increased moment of inertia for even greater strength and stiffness for a given inflatable structure. This invention is applicable to, but not limited to structures for shelters, bridges, deployable wings, and space structures.

SUMMARY OF THE INVENTION

This invention uses external bracing tensioned by inflatable structures. The external tensile members are made of high modulus fibers and are spaced away from the central inflatable structure by transverse frames. The structure can be made rigid after deployment by unidirectional bundles of fibers to maximize compression performance after deployment. A truss can be made up of a central inflatable structure or member that is strengthened with external braces made of high modulus fibers spaced away from the central member by transverse frames. A structural member arch can be strengthened using a cable below the member and parallel to it at some distance with spoke-like linear attachments holding the member shape under loads that would tend to collapse the arch. A deployable wing with an inflatable member spar that also relies on span-wise tension in the skin of the wing for maintenance of shape, would operate under the same principle as the other externally braced inflatable structures of this invention.

DETAILED DESCRIPTION

Figure 1:
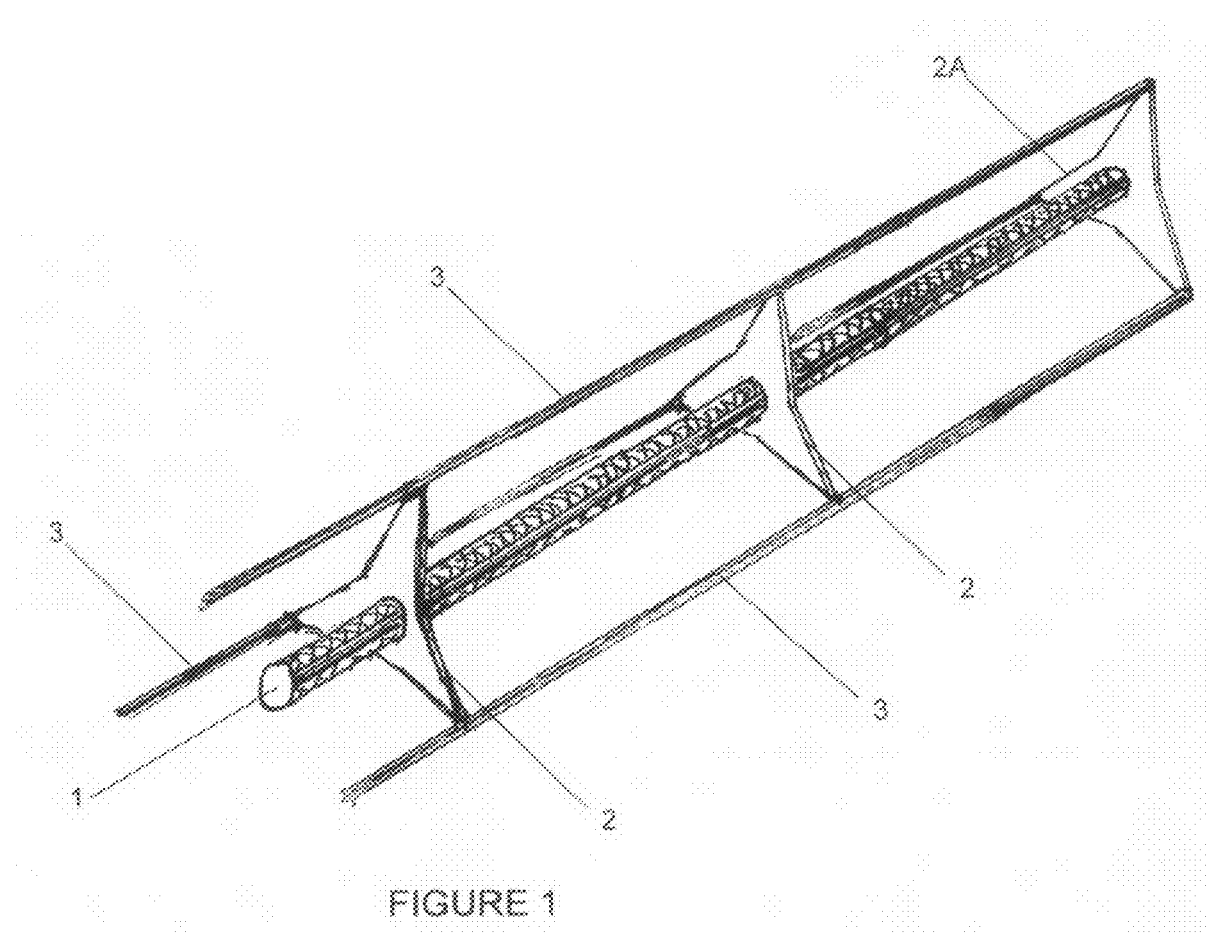
FIG. 1 shows an inflatable structure with three external tension cables.
Figure 2:
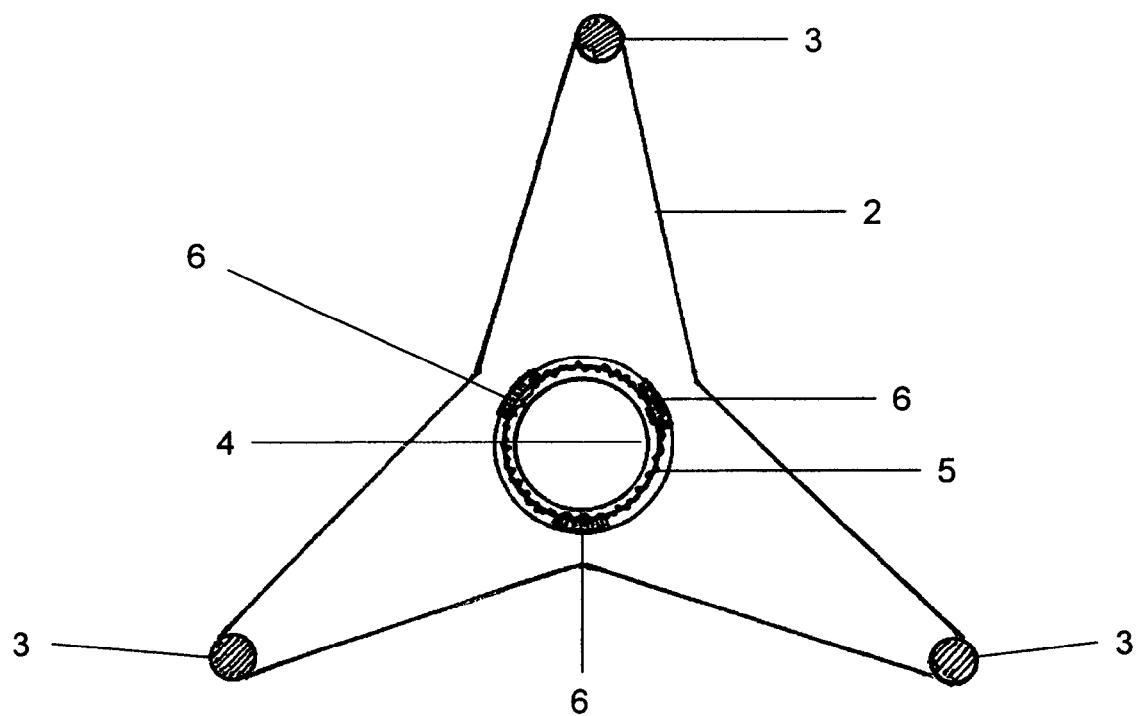
FIG. 2 shows a cross section of the inflatable structure of FIG. 1.

A truss-like structure is illustrated in FIG. 1 and in FIG. 2, a cross section. The inflatable beam or member 1 comprises a bladder 4, a braided restraint layer 5 and axial reinforcement straps 6. The bladder 4 holds inflation gas, but has no structural function. The braided restraint layer 5 retains the gas pressure and provides shear and torsion resistance. The axial reinforcement straps 6 govern the inflatable structure's bending strength and stiffness. Transverse frames 2 restrain and align the bracing cables 3 at a distance from, and parallel to the central inflatable structure 1. The end transverse frames 2A provide tension to the bracing cables 3 at a distance from and parallel to the central inflatable structure 1. The end transverse frames 2A provide tension to the bracing cables 3 at a distance from and parallel to the central inflatable structure 1.

The end transverse frames 2A provide tension to the bracing cables 3 by the action of the central inflatable structure 1 tending to elongate when pressured. The axial reinforcement straps 6 are also tensioned by this action. A designer, by choosing materials with a particular elastic modulus, and by determining the amount of weight per unit length of each material, determines how much tension is carried in the bracing cables 3 compared to the tension carried in the axial reinforcement straps 6, and, thus, tailors the structural properties of the truss-like externally braced structure.

Variations of this embodiment include trusses and beams, similar structures with more than three external cables and optional diagonal cables between transverse frames to increase shear and torsion stiffness and strength.

The various flexible elements of the truss example may be infused with a resin that is controllably hardened to create a permanently rigid structure that does not depend on the maintaining of the inflation pressure. This may be advantageous for very large structures for use in space that can be initially stowed in a small volume for launch.

Figure 3:
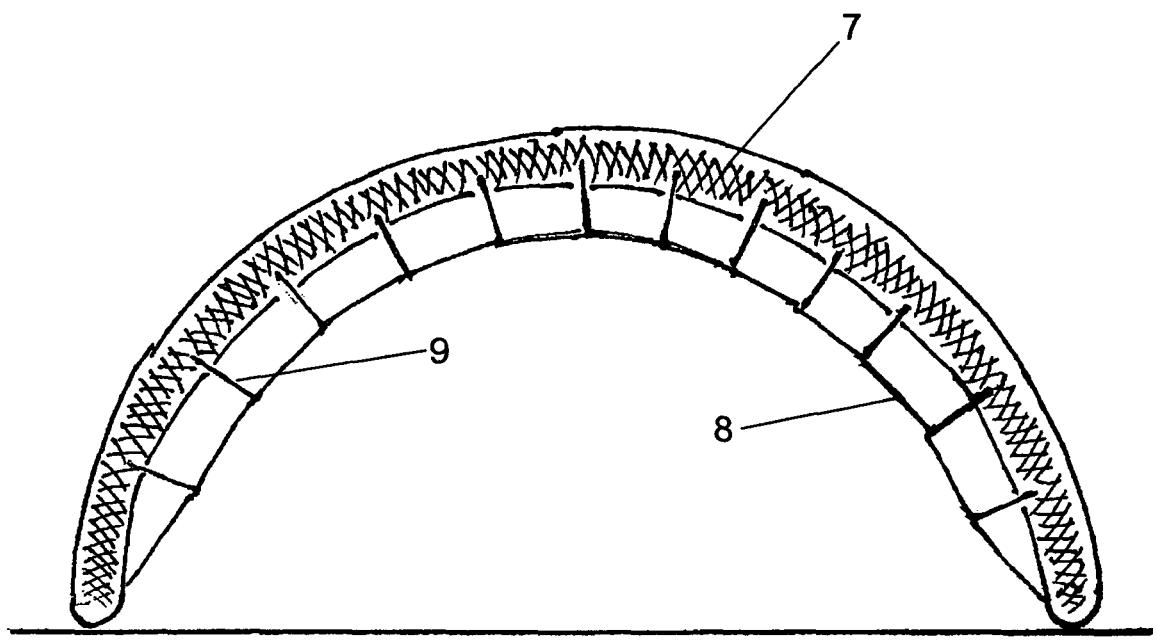
FIG. 3 shows an arch with an inside strengthening cable.
Figure 4:
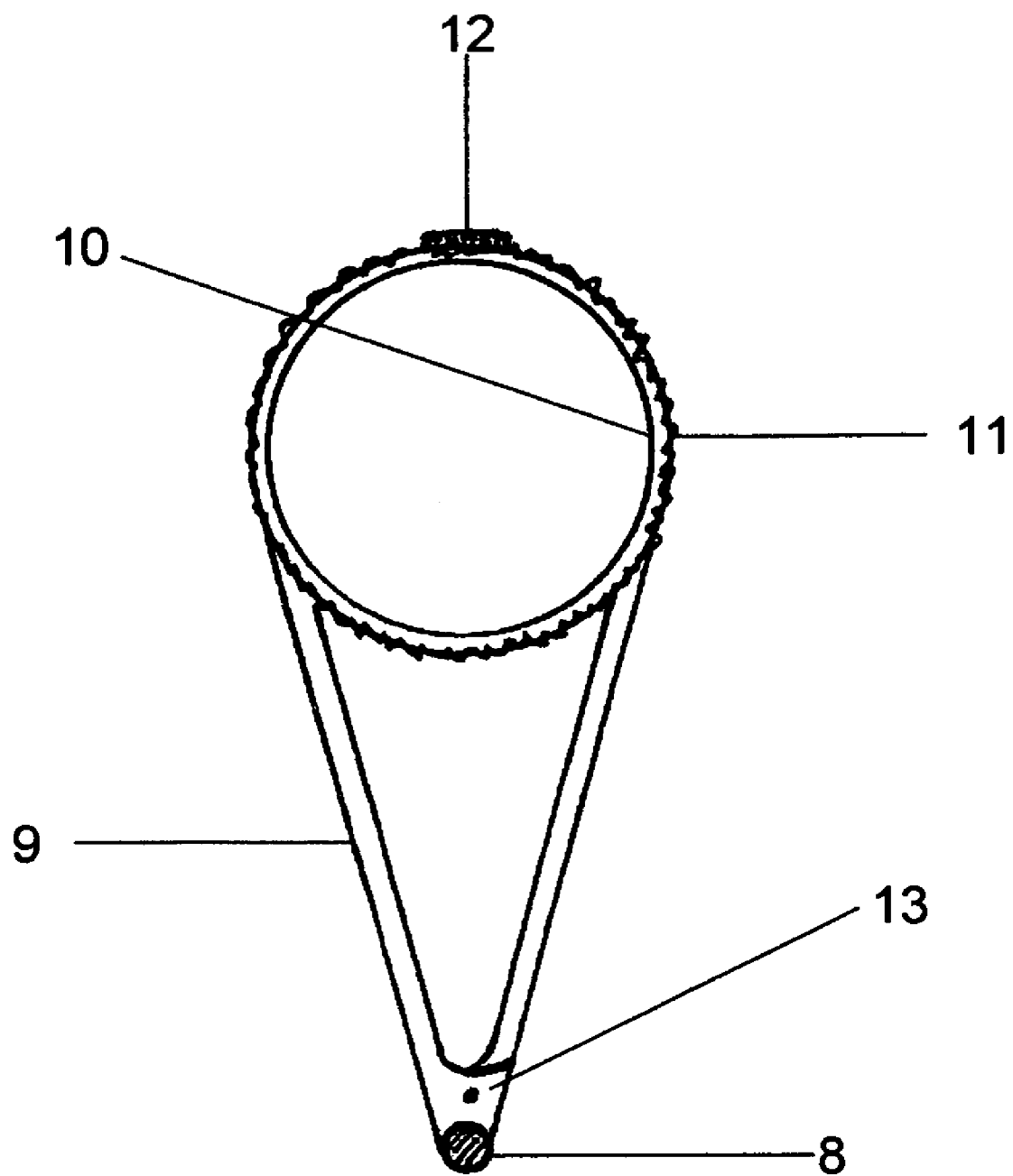
FIG. 4 shows a cross-section of FIG. 3.

An arched beam structure is illustrated in FIGS. 3 and 4. The inflatable component 7 is an inflatable beam comprising a gas-impermeable bladder 10, a braided restraint layer 11 and one axial reinforcement strap 12. The bladder 10 retains inflation gas, but has no structural function. The braided restraint layer 11 lends the structure the capability to retain high pressure, provides shear and torsion resistance, and can be curved during the manufacturing process without wrinkling. Transverse frames 9 restrain and align the bracing cable 8 at a distance from the central inflatable component 7. Pivots 13 can be provided as part of the transverse frames 9 to reduce the size of the transverse frames 9 when the arched beam structure is deflated and folded for storage.

Inflating the inflatable component causes the axial reinforcement strap 12 and the bracing cable 8 to be tensioned. Tension is provided to the axial reinforcement strap 12 and to the bracing cable 8 by the action of the central inflatable structure 7 that elongates and straightens when pressurized. Such action, which the designer controls by choice of the various materials, material weight per unit length, inflatable component 7 diameter, and the offset distance of the bracing cable 8 from the inflatable component 7, determines the strength and stiffness of the arched beam.

Compared to an un-braced inflatable structure, the arched beam of FIG. 3 will have increased strength for downward loads, and little or no advantage for upward loads. Therefore, it would be beneficial for supporting structures subject to high snow loads, or for buried shelters as may be needed for lunar habitation.

Variations of the arched beam of FIG. 3 include designs with multiple axial reinforcement straps 12 and/or multiple bracing cables for increasing strength in the direction perpendicular to the plane of the arch.

Figure 6:
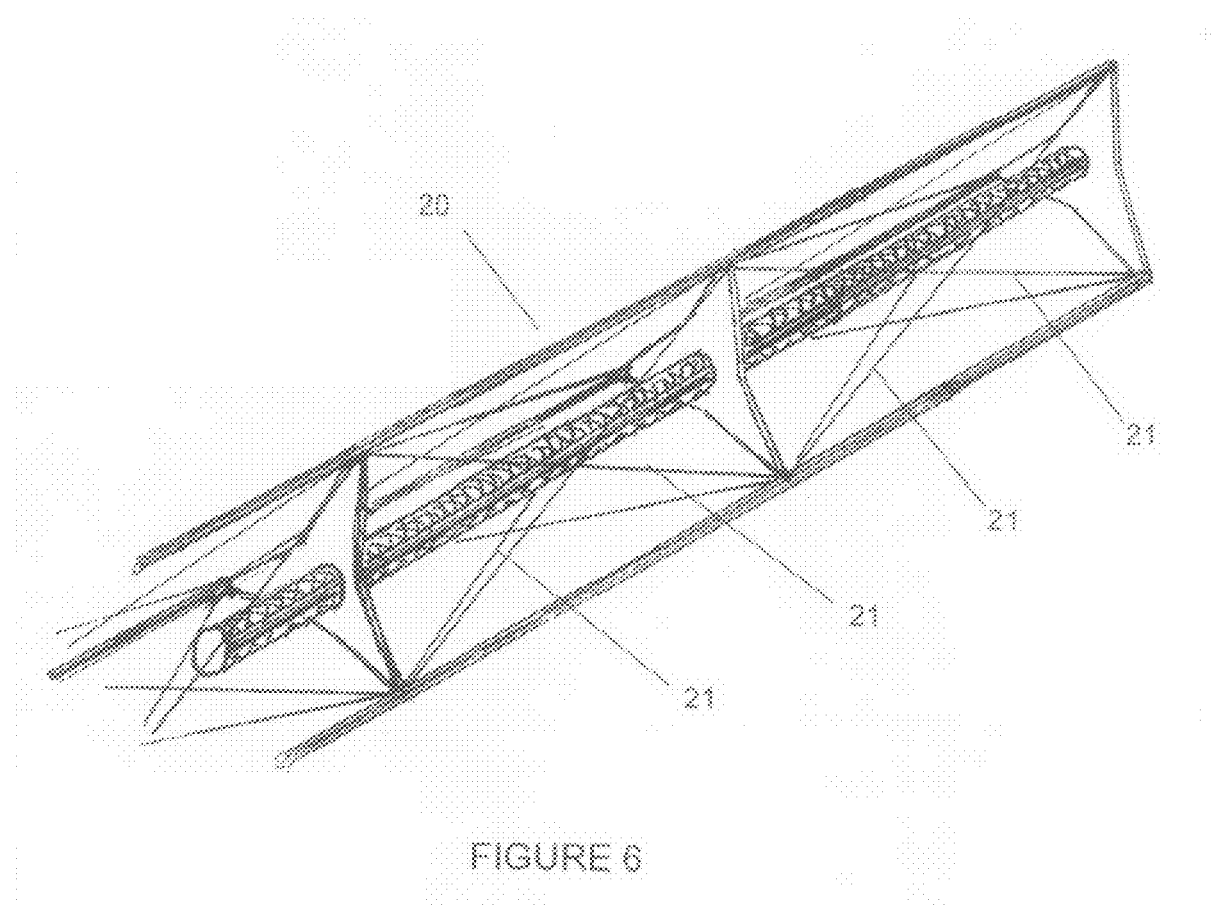
FIG. 6 shows the inflatable structure with diagonal cables.

In FIG. 6 the structure of FIG. 1 (20) is reinforced with diagonal cables 21. Such diagonal cables enhance the structure when the shear stiffness of the inflated member is not sufficient.

Figure 5:
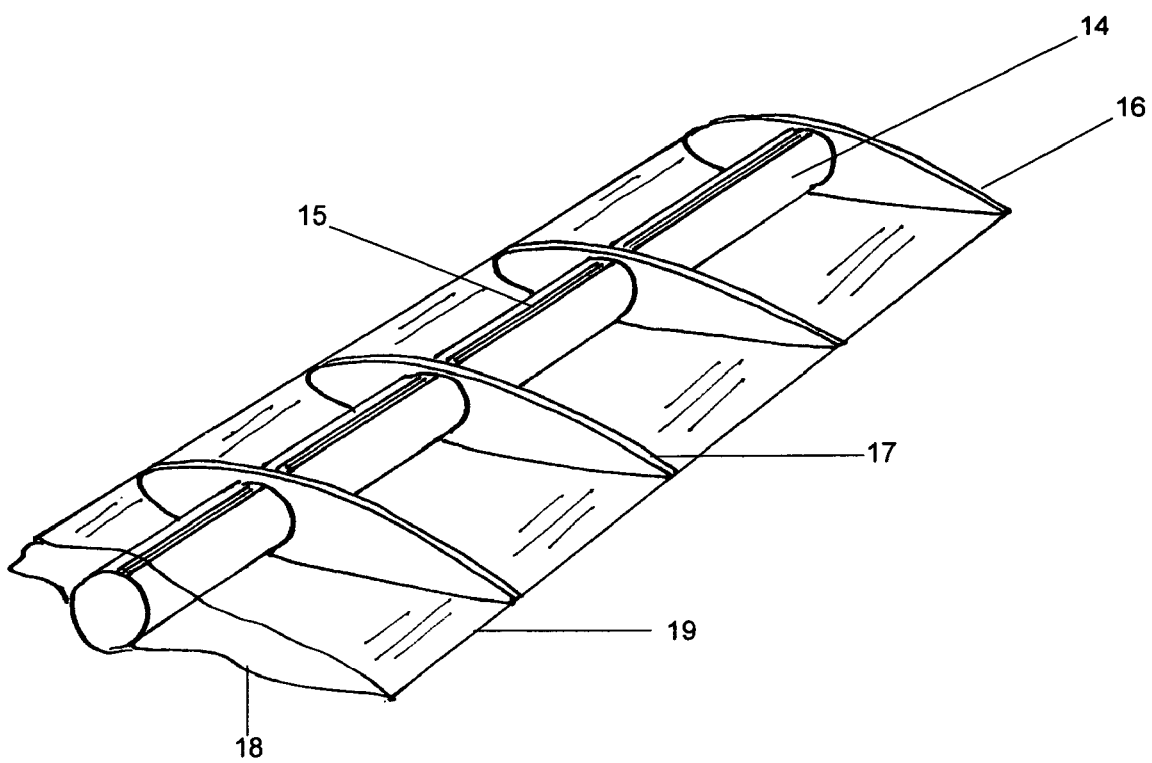
FIG. 5 shows an inflated wing.

Another example of an externally braced inflatable structure is the membrane wing shown in FIG. 5. The inflatable spar 14 comprises a gas-impermeable bladder, a braided restraint layer, and axial reinforcement straps 15 previously described. The wing skin membrane 18 encloses the spar 14 and ribs 17 and provides the aerodynamic surface of the wing. The membrane 18 is attached to the tip rib 16 such that the action of the inflatable spar tending to elongate when pressurized creates tension in the membrane. A chord 19, forming the trailing edge of the wing, is also tensioned by said action of the inflatable spar 14, "span-wise", which is necessary for controlling the aerodynamic shape of the membrane 18 between 16 and 17.

In the wing example, the benefit of external bracing is not improved structural performance; it is the ability to control the distribution of tension into the wing skin membrane 18 for an aerodynamic benefit.

Variations of the inflatable wing example include additional inflatable elements to further improve membrane shape, the addition of cords or fibers to the membrane in order to tailor its modulus, and ribs that bend or have pivoting means in order to fold the wing flat for storage.

The invention claimed is:

1. A reinforced inflatable structure comprising:
an inflatable member including a longitudinal axis, the member comprising a bladder and a braided restraint layer mounted to the bladder, a plurality of spaced transverse frames mounted on said member and extending outwardly therefrom, and a plurality of spaced bracing cables connected at each end to a respective one of said plurality of frames, said cables being arranged parallel to said axis and held at a fixed distance from said member by said transverse frames, wherein the inflatable member tensions the bracing cables rendering them capable of resisting bending.

2. The structure of claim 1 in which there are three or more bracing cables spaced at equal distances from said member.

3. The structure of claim 1 in which said bracing cables are infused with a resin and wherein said cables are made rigid by a curing of said resin while said structure is inflated.

4. The structure of claim 1 in which said member is curved.

5. The structure of claim 1 in which said structure comprises a wing, said transverse frames being airfoil-shaped ribs of said wing, and said bracing cables are represented by a tensioned membrane forming the airfoil surface of said wing.

6. The structure of claim 1 that can be folded for transportation before it is inflated.

7. The structure of claim 1 further comprising at least one diagonal cable connected between an adjacent pair of said plurality of transverse frames.

8. The structure of claim 1 wherein at least one of said plurality of transverse frames is rigid.

9. An externally braced inflatable structure comprising:
an elongated selectively inflatable member including a braided layer and a longitudinal axis, at least two frames mounted on said member and in contact therewith when said member is inflated, said at least two frames extending generally transversely away therefrom, and a bracing cable connected to said at least two frames, said cable being arranged generally parallel to said axis and held at a fixed distance from said member by said at least two frames.

10. The structure of claim 9 wherein three bracing cables are spaced at equal distances from said member.

11. The structure of claim 10 in which said bracing cables are infused with a resin and wherein said cables are made rigid by a curing of said resin while said structure is inflated.

12. The structure of claim 9 further comprising at least one diagonal cable connecting said at least two frames.

13. The structure of claim 9 wherein at least one of said plurality of frames is rigid.

14. An externally braced inflatable structure comprising:
an elongated selectively inflatable member including a longitudinal axis;
at least two spaced rigid frame members mounted to an exterior surface of said inflatable member and extending away therefrom;
at least one bracing cable connected between said at least two spaced frame members;
wherein said at least one bracing cable is located at a generally constant distance from said longitudinal axis.

15. The structure of claim 14 wherein at least two bracing cables are held at a generally fixed distance from said member by said at least two frame members.

16. The structure of claim 14 wherein one of said at least two frame members comprises a body having three apexes and wherein three spaced bracing cables are provided one being connected to said body adjacent each of the three apexes.

17. The structure of claim 16 wherein the three apexes are equiangularly distributed around said body.

18. The structure of claim 14 further comprising at least one diagonal cable connecting said at least two frame members.

19. The structure of claim 14 wherein said at least two spaced frame members encircle said inflatable member.

20. The structure of claim 14 wherein said longitudinal axis is one of straight and curved.

* * * * *